US008935132B2

(12) United States Patent  (10) Patent No.: US 8,935,132 B2
Lam et al.  (45) Date of Patent: Jan. 13, 2015

(54) SPECTRAL SIMULATION METHOD DURING NOISE TESTING FOR A MAGNETIC HEAD, AND NOISE-TESTING METHOD FOR A MAGNETIC HEAD BY USING THE SAME (75) Inventors: Hokei Lam, Hong Kong (CN); Cheukman Lui, Hong Kong (CN); Chiuming Lueng, Hong Kong (CN); Kaichiu Cheung, Hong Kong (CN); Wahchun Chan, Hong Kong (CN); Juren Ding, Hong Kong (CN); Rongkwang Ni, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 340 days.

(21) Appl. No.: 13/368,762

(22) Filed: Feb. 8, 2012

(65) Prior Publication Data
US 2013/0204590 A1 Aug. 8, 2013

(51) Int. Cl.
G06F 17/10 (2006.01)
G11B 5/455 (2006.01)
G11B 19/04 (2006.01)

(52) U.S. Cl.
CPC .............. G11B 5/455 (2013.01); G11B 19/048 (2013.01)
USPC .............................. 703/2; 360/110; 369/53.38

(58) Field of Classification Search
None
See application file for complete search history.

(56) References Cited

U.S. PATENT DOCUMENTS 5,134,366 A * 7/1992 Kirk .............................. 324/210
5,287,228 A * 2/1994 Sawaguchi et al. ............. 360/57
5,530,750 A * 6/1996 Akagiri ......................... 704/500
5,838,153 A * 11/1998 Inbar ............................. 324/212
6,943,545 B2 * 9/2005 Patland et al. ................ 324/210
7,026,810 B2 * 4/2006 Kikugawa et al. ............ 324/210
7,242,550 B2 * 7/2007 Hara et al. .................. 360/77.02
8,102,613 B2 * 1/2012 Duan et al. ..................... 360/31
2001/0048303 A1 * 12/2001 Hachisuka et al. ........... 324/210
2002/0131188 A1 * 9/2002 Hamaguchi et al. ............ 360/31
2003/0053235 A1 * 3/2003 Kikugawa et al. .............. 360/31
2003/0234646 A1 * 12/2003 Patland et al. ................ 324/210
2005/0204285 A1 * 9/2005 Kikugawa et al. ............ 715/704
2007/0070869 A1 * 3/2007 Hara et al. .................. 369/275.1
2008/0186608 A1 * 8/2008 Arai ................................ 360/31
2009/0002899 A1 * 1/2009 Koui ........................ 360/324.12
2009/0141384 A1 * 6/2009 Itakura et al. ................... 360/31
2009/0147389 A1 * 6/2009 Taratorin et al. ................ 360/31
2009/0154726 A1 * 6/2009 Taenzer ........................ 381/94.1
2010/0063393 A1 * 3/2010 Moradi et al. ................ 600/442
2012/0093501 A1 * 4/2012 He et al. ......................... 398/26
2013/0294210 A1 * 11/2013 Taratorin ................... 369/53.38

* cited by examiner

Primary Examiner — Omar Fernandez Rivas
Assistant Examiner — Kibrom K Gebresilassie
(74) Attorney, Agent, or Firm — Nixon & Vanderhye PC (57) ABSTRACT A spectral simulation method during a noise testing for a magnetic head, includes steps of (a1) detecting several first noise profiles for several magnetic head samples under a first frequency bandwidth range by a dynamic testing machine; (b1) separating each first noise profile into at least two noise curves including a first noise curve and a second noise curve at a predetermined frequency bandwidth, wherein the first noise curve has a frequency bandwidth range lower than that of the second noise curve; (c1) fitting several mathematical equations according to the second noise curves; and (d1) establishing a correlative equation among the mathematical equations, so as to simulate the second noise curve for each magnetic head. The present invention can simulate a second noise curve of the noise profile in a higher frequency bandwidth and establishing the correlative equation according to the second noise curve.

21 Claims, 6 Drawing Sheets

SPECTRAL SIMULATION METHOD DURING NOISE TESTING FOR A MAGNETIC HEAD, AND NOISE-TESTING METHOD FOR A MAGNETIC HEAD BY USING THE SAME

FIELD OF THE INVENTION

The present invention relates to information recording disk drive devices and, more particularly, to a spectral simulation method during noise testing for a magnetic head used in the disk drive device, and a noise-testing method for a magnetic head by using the same. More specifically, the present invention is directed to a noise-testing method by a quail-static testing machine under a higher frequency bandwidth range.

BACKGROUND OF THE INVENTION

As hard disk drive apparatuses increase in capacity and reduce in size, highly sensitive and high-resolution thin-film magnetic heads are being demanded. In order to satisfy the demand, giant magentoresistive effect (GMR) thin-film magnetic heads with GMR read head elements each having a multi-layered structure with a magnetization-fixed layer and a magnetization-free layer become widely used. On the other hand, tunnel magnetoresistive effect (TMR) thin-film magnetic heads with TMR read head elements having higher sensitivity and higher resolution are put to practical use.

In thin-film magnetic heads with MR read head element, defective products that generate noises, for example Barkhausen noise, in their outputs may be included. The Barkhausen noise is generated primarily because a magnetic domain wall is caught in defects in the magnetic film constituting the MR read head element as the magnetic domain wall moves, and is affected substantially by stress applied to the MR read head element. As the noise generated, the performance of the magnetic head is weakened, for example, the flying height of the magnetic head is unstable and hard to control, which cause the stability is reduced and, in turn, the reading performance is weakened.

Thus, a noise testing process must be carried out before the magnetic head product is put into use. One of common methods for determining whether a magnetic head is acceptable or defective by measuring noise generated in response to sense current with various frequency bandwidths and various values flowing through the magnetic head. And noise profile can be obtained and a noise level of the magnetic head can be measured out, in turn, an acceptable or defective magnetic head can be estimated and judged. Concretely, this conventional noise testing method includes two types which are quasi-static testing and dynamic testing.

Accordingly, a quasi-static testing machine and a dynamic testing machine are used. The quasi-static testing machine is a testing machine that saves time, and the efficiency is higher, which can measure the noise profile of the magnetic head with 0~80 MHz however. That is, the current limited frequency bandwidth can be extended is 80 MHz merely. It's very difficult to measure out the noises generated in higher frequency bandwidth over 80 MHz. Therefore, the dynamic testing machine is used for detecting the noise under a wider frequency bandwidth extended. Currently, the frequency bandwidth of the dynamic testing machine can be up to very high, such as 1 GHz, even higher which depends on the testing unit. Commonly, the relationship between the frequency bandwidth and the noise level can be represented by a noise profile, which illustrates a noise feature of the magnetic head. From the noise profile, the noise level can be measured out. Compared with the quasi-static testing method, the dynamic testing method has a higher accuracy, the noise happened in the higher frequency bandwidth also can be detected. However, the dynamic testing method takes a long time, and the testing efficiency is quite low. Thus it would be unpractical if branches of magnetic heads need to be tested.

Thus, the people are eager for an improved quasi-static testing method to perform a noise testing to the magnetic head under a wider frequency bandwidth range by using a quasi-static testing machine, which can save time, improve testing efficiency and achieve high accuracy.

SUMMARY OF THE INVENTION

One aspect of the present invention is to provide a spectral simulation method during a noise testing for a magnetic head, which can simulate a second noise curve of the noise profile in a higher frequency bandwidth and establishing a correlative equation according to the second noise curve.

Another aspect of the present invention is to provide a noise-testing method for a magnetic head by using the mentioned-above spectral simulation method, which can detect the noise in higher frequency bandwidth range by using a quasi-static testing machine, and save testing time improve testing efficiency and achieve high accuracy.

To achieve above objectives, a spectral simulation method during a noise testing for a magnetic head of the present invention includes steps of (a1) detecting several first noise profiles for several magnetic head samples under a first frequency bandwidth range by a dynamic testing machine; (b1) separating each first noise profile into at least two noise curves including a first noise curve and a second noise curve at a predetermined frequency bandwidth, wherein the first noise curve has a frequency bandwidth range lower than that of the second noise curve; (c1) fitting several mathematical equations according to the second noise curves; and (d1) establishing a correlative equation among the mathematical equations, so as to simulate the second noise curve for each magnetic head.

Preferably, the mathematical equations and the correlative equation in the step (c1) and step (d1) are linear functions.

As an exemplary embodiment, the step (c1) includes sub-step (c11) of fitting several straight lines according the second noise curves, and obtaining several slopes and intercepts according to the straight lines; the step (d1) includes sub-step (d11) of establishing a first linear function according to several slopes and the intercepts.

Preferably, the step (d1) further comprises sub-step (d12) of repeating the step (b1) at a plurality of different predetermined frequency bandwidths respectively to obtain several second noise curves, and repeating the sub-steps (c11) and (d11), so as to establish a plurality of different first linear functions and obtained a constant intercept.

Preferably, the step (d1) further includes sub-step (d13) of establishing a second linear function according to the different first linear functions, thereby obtaining a correlative equation between the predetermined frequency bandwidth and the slopes of the first linear function.

Preferably, the step (d1) further includes sub-step (d14) of establishing a general formula between noise level and the predetermined frequency bandwidth according to the second linear function estimated in the sub-step (d13) and the constant intercept estimated in the sub-step (d12).

As another embodiment, the first frequency bandwidth range is from 0 Hz to 1 GHz.

Preferably, the first frequency bandwidth range is from 0 Hz to 300 MHz.

As yet an embodiment, the predetermined frequency bandwidth has a range of 0 Hz~200 MHz.

Preferably, the predetermined frequency bandwidth is 80 MHz.

A noise-testing method for a magnetic head by using the spectral simulation method of the present invention includes steps of (a) detecting a third noise curve of a second noise profile for a magnetic head under a range from 0 Hz to the predetermined frequency bandwidth by a quasi-static testing machine; (b) amplifying third noise curve of the second noise profile so as the gain is coincident with that of the first noise curve of the first noise profile; and (c) simulating a fourth noise curve of the second noise profile according to the correlative equation under frequency bandwidths higher than the predetermined frequency bandwidth.

Therein, the simulation method includes steps of (a1) detecting several first noise profiles for several magnetic head samples under a first frequency bandwidth range by a dynamic testing machine; (b1) separating each first noise profile into at least two noise curves including a first noise curve and a second noise curve at a predetermined frequency bandwidth, wherein the first noise curve has a frequency bandwidth range lower than that of the second noise curve; (c1) fitting several mathematical equations according to the second noise curves; and (d1) establishing a correlative equation among the mathematical equations, so as to simulate the second noise curve for each magnetic head.

Preferably, the mathematical equations and the correlative equation in the step (c1) and step (d1) are linear functions.

As an exemplary embodiment, the step (c1) includes substep (c11) of fitting several straight lines according the second noise curves, and obtaining several slopes and intercepts according to the straight lines; the step (d1) includes sub-step (d11) of establishing a first linear function according to several slopes and the intercepts.

Preferably, the step (d1) further comprises sub-step (d12) of repeating the step (b1) at a plurality of different predetermined frequency bandwidths respectively to obtain several second noise curves, and repeating the sub-steps (c11) and (d11), so as to establish a plurality of different first linear functions and obtained a constant intercept.

Preferably, the step (d1) further includes sub-step (d13) of establishing a second linear function according to the different first linear functions, thereby obtaining a correlation between the predetermined frequency bandwidth and the slopes of the first linear function.

Preferably, the step (d1) further includes sub-step (d14) of establishing a general formula between noise level and the predetermined frequency bandwidth according to the second linear function estimated in the sub-step (d13) and the constant intercept estimated in the sub-step (d12).

As another embodiment, the first frequency bandwidth range is from 0 Hz to 1 GHz.

Preferably, the first frequency bandwidth range is from 0 Hz to 300 MHz.

As yet an embodiment, the predetermined frequency bandwidth has a range of 0 Hz~200 MHz.

Preferably, the predetermined frequency bandwidth is 80 MHz.

Comparing with the prior art, as the present invention separates the noise profile into a lower frequency bandwidth curve and a higher frequency bandwidth curve, and establishing the correlative equation for the higher frequency bandwidth. Thus, the present invention can use a quasi-static testing machine to detect noise curve in the lower frequency bandwidth firstly, and then simulate the noise curve in the higher lower frequency bandwidth according to the correlative equation, thereby obtaining a whole noise profile of the magnetic head in a sufficient frequency bandwidth range, without using the dynamic testing machine. Therefore, the defective magnetic head can be detected only by the quasi-static testing machine, which saves the testing time, improve the testing efficiency and achieve high testing accuracy.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a spectral simulation method during a noise testing for a magnetic head and a noise-testing method for a magnetic head by using the mentioned-above spectral simulation method, which can detect the noise in higher frequency bandwidth range by using a quasi-static testing machine, and save testing time improve testing efficiency and achieve high accuracy.

Figure 1:
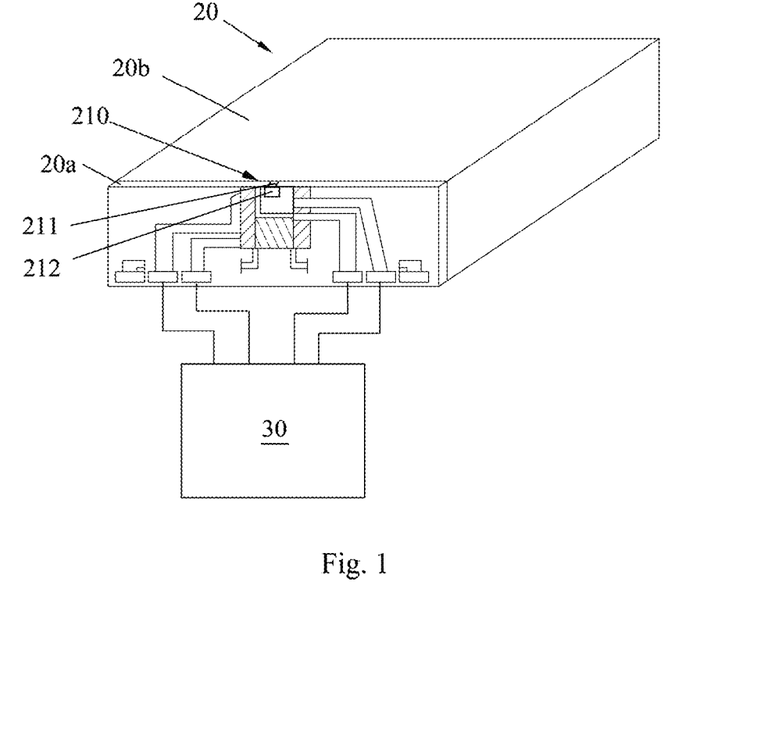
FIG. 1 is a perspective view of a slider, which is connected by a dynamic testing machine according to the present invention.

FIG. 1 schematically illustrates a configuration of a magnetic head of a slider separated individually and a dynamic testing machine 30 used for performing a noise testing of the magnetic head. In this figure, reference numeral 20 denotes a slider individually separated. On an element-formation surface 20a that is a trailing surface of this slider 20, a thin-film magnetic head 210 is formed. An air bearing surface (ABS) 20b shaped to obtain an appropriate flying height is formed on the slider 20 to become substantially perpendicular to the element-formation surface 20a.

Figure 2:
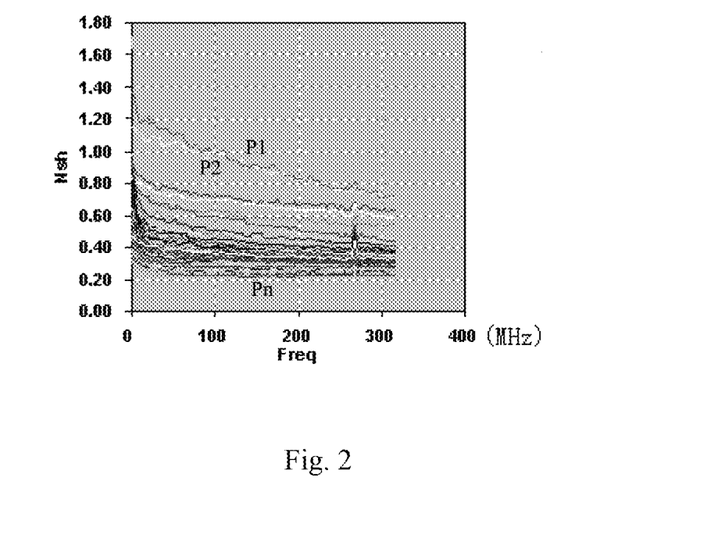
FIG. 2 shows noise profiles of a plurality of magnetic head samples detected by the dynamic testing machine according to the present invention.

The magnetic head 210 includes an MR read head 211 for reading out data signal recorded on a magnetic disk, and a write head 212 for writing data signal onto the magnetic disk. Several terminal electrodes 201 are electrically connected to the MR read head 211 for applying current to the MR read head 211, and a pair of output electrodes (not shown) is electrically connected to the MR read head 211 and the dynamic testing machine 30. Under this situation, a level of noises such as Barkhausen noises contained an output from the MR read head 211 are measured to discriminate a magnetic head potentially causing noises under a specific environment by applying a various current with various frequency bandwidths to the MR read head 211. FIG. 2 shows noise profiles P1~Pn of a plurality of magnetic head samples detected by the dynamic testing machine 30 according to the present invention. The X-axis denotes a frequency bandwidth, and the Y-axis denotes a noise level of each magnetic head. Commonly, the noise level of a magnetic head becomes decreased if applied a current with a higher frequency bandwidth. The present invention aims at simulating a noise curve of the noise profile under the higher frequency bandwidth range. Detailed explanations of the simulation method follow.

Figure 3:
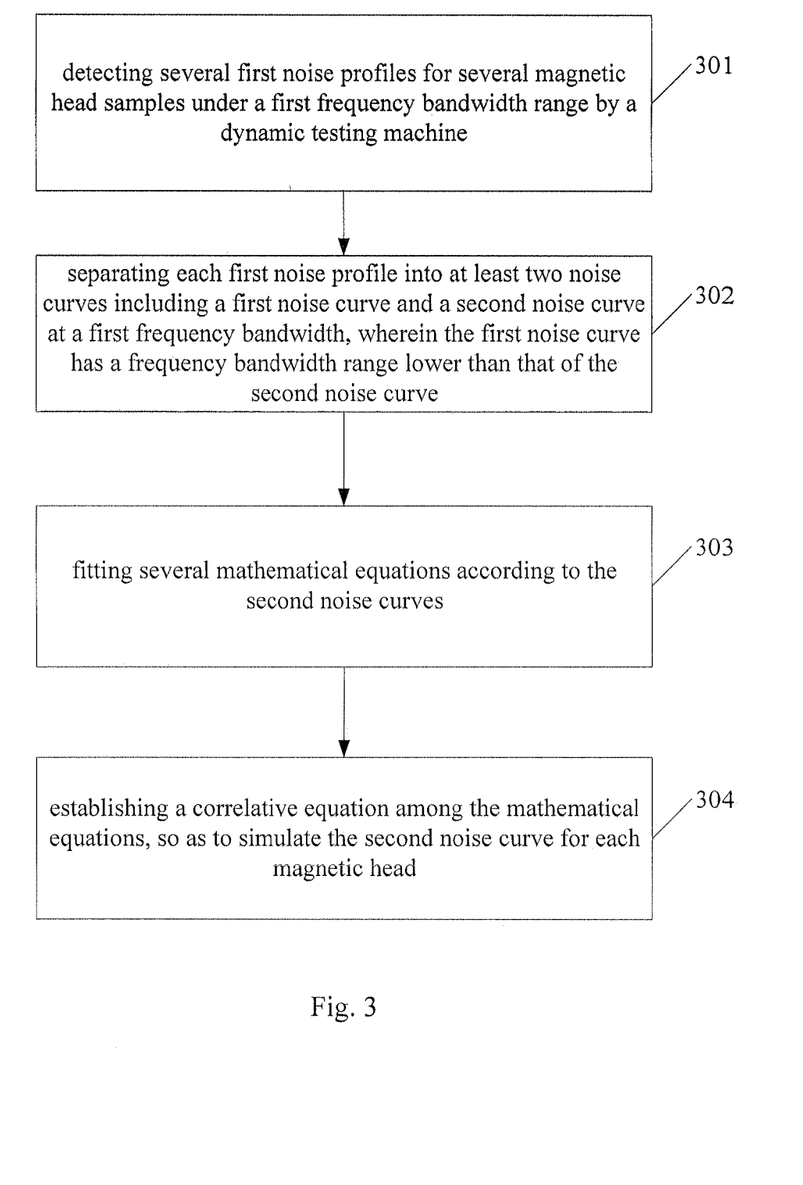
FIG. 3 is a flowchart of a spectral simulation method during a noise testing for a magnetic head according to an embodiment of the present invention.

FIG. 3 is a flowchart of a spectral simulation method during a noise testing for a magnetic head according to a first embodiment of the present invention. As shown, the spectral simulation method includes:

Step (301), detecting several first noise profiles for several magnetic head samples under a first frequency bandwidth range by a dynamic testing machine;

Step (302), separating each first noise profile into at least two noise curves including a first noise curve and a second noise curve at a first frequency bandwidth, wherein the first noise curve has a frequency bandwidth range lower than that of the second noise curve;

Step (303), fitting several mathematical equations according to the second noise curves; and Step (304), establishing a correlative equation among the mathematical equations, so as to simulate the second noise curve for each magnetic head.

By combining with FIG. 2, the first frequency bandwidth range is from 0 Hz to 1 GHz, preferably is from 0 Hz to 300 MHz. Several first noise profiles P1~Pn for a group of magnetic head samples are obtained in the step (301).

In the step (302), each of the first noise profile P1~Pn is separated into two sections which are first noise curve F1~Fn and second noise curve S1~Sn at a predetermined frequency bandwidth. Alternatively, the first noise profile P1~Pn can be separated into more than two sections. Alternatively, the predetermined frequency bandwidth has a range of 0 Hz~200 MHz for example. Preferably, the predetermined frequency bandwidth value is available to a quasi-static testing machine, such as 50 MHz or 80 MHz and the like. In this embodiment, the predetermined frequency bandwidth is 80 MHz. Thus, the first noise curves F1~Fn locate at a frequency bandwidth range that is lower than that of the second noise curves S1~Sn.

In this embodiment, the mathematical equations and the correlative equation in the step (303) and step (304) are linear functions. Concretely, the step (303) includes fitting several straight lines according the second noise curves, and obtaining several slopes and intercepts according to the straight lines; the step (304) includes establishing a first linear function according to the said slopes and the intercepts.

Figure 4:
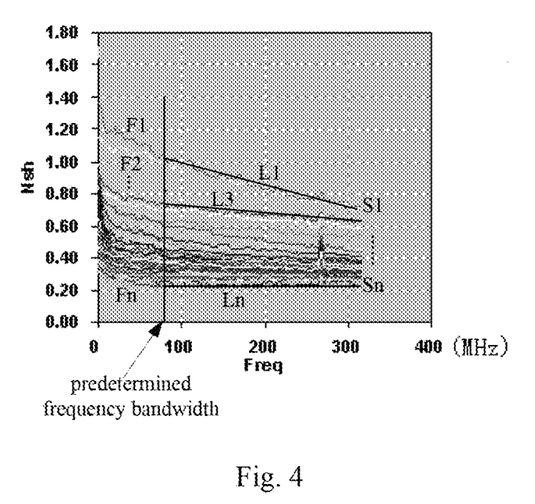
FIG. 4 shows simulated straight lines fit to the second noise curves of the noise profiles shown in FIG. 2.
Figure 5:
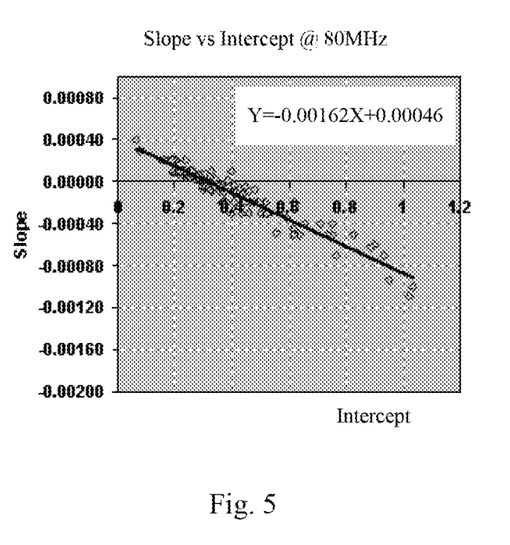
FIG. 5 shows the relationship between the slopes and intercepts of the straight lines shown in FIG. 4.

After the separation of the noise profiles P1~Pn, inventors found that the second noise curves S1~Sn always show a trend of linear function, thus a simulation to the second noise curves S1~Sn is tried to carry out. A straight line L1 is fit to the second noise curve F1, as shown in FIG. 4. Similarly, straight lines L2~Ln are fit to the second noise curves S2~Sn respectively. According to two data points on the straight line L1, its slope and intercept are calculated. Similarly, a plurality of slopes and intercepts according to the straight lines L2~Ln is calculated. And all slopes and intercepts of the straight lines L1~Ln are traced as shown in FIG. 5. Therein, X-axis denotes intercepts of the straight lines L1~Ln, Y-axis denotes slopes of the straight lines L1~Ln. From this figure, a first linear function is simulated to establish. In this embodiment, the first linear function established is:

$$Y=-0.00162X+0.00046 \qquad \text{Equation (1)}$$

Thus, the second noise curves S1~Sn can be simulated by the equation (1).

For improving the simulation accuracy, a preferred embodiment follows based on the embodiment mentioned above. In this embodiment, several different predetermined frequency bandwidths are configured, such as 50 MHz, 80 MHz, 100 MHz, 150 MHz, 180 MHz and 200 MHz, which are not limited. In other words, similarly, each of the first noise curve P1~Pn is separated into two sections which are first noise curves F1~Fn and second noise curves S1~Sn at the predetermined frequency bandwidths 50 MHz, 80 MHz, 100 MHz, 150 MHz, 180 MHz and 200 MHz respectively. Based on the simulation method described in the above embodiment, a plurality of different first linear functions is established, and their slopes and intercepts are shown in the following table 1.

TABLE 1

| Predetermined frequency bandwidth (MHz) | Slope | Intercept |
| --- | --- | --- |
| 50 | −0.00167 | 0.00046 |
| 80 | −0.00162 | 0.00046 |
| 100 | −0.00158 | 0.00046 |
| 150 | −0.00149 | 0.00047 |
| 180 | −0.00141 | 0.00046 |
| 200 | −0.00138 | 0.00045 |

Figure 6:
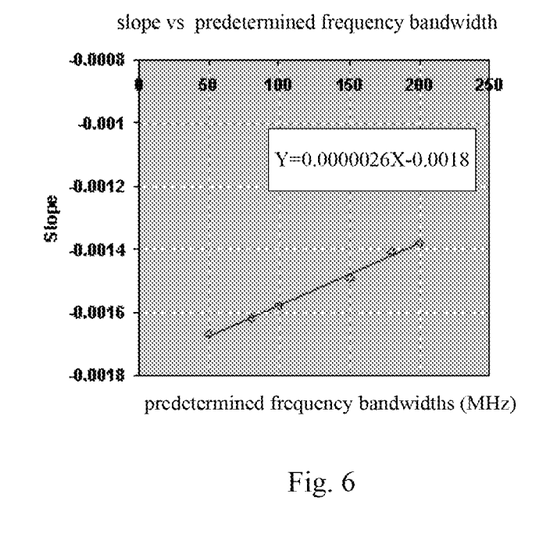
FIG. 6 shows the relationship between the predetermined frequency bandwidths and the slopes shown in the table 1.

It can be seen from the table 1, the intercept is constant substantially, equal to 0.00046. And the slopes are correlated with the predetermined frequency bandwidths, as shown in FIG. 6. Therein, a second linear function between the slopes predetermined frequency bandwidths is established:

$$\text{Slope } A = Y = 0.0000026X - 0.0018 \qquad \text{Equation (2).}$$

Thus, any corresponding slope can be estimated by the second linear function while any predetermined frequency bandwidth is input. Thus, a general formula of the noise level:

$$Nsh=(\text{Slope}A)X+0.00046 \qquad \text{Equation (3),}$$

wherein the Slope A can be estimated by the equation (2), x denotes the predetermined frequency bandwidth.

In conclusion, the general formula of the noise level is established in this embodiment. Compared with the first embodiment, the predetermined frequency bandwidth in this embodiment is optional, not given. Thus, any noise profile represented at the frequency bandwidth range that is larger than the predetermined frequency bandwidth can be simulated by the equation (3).

Figure 7:
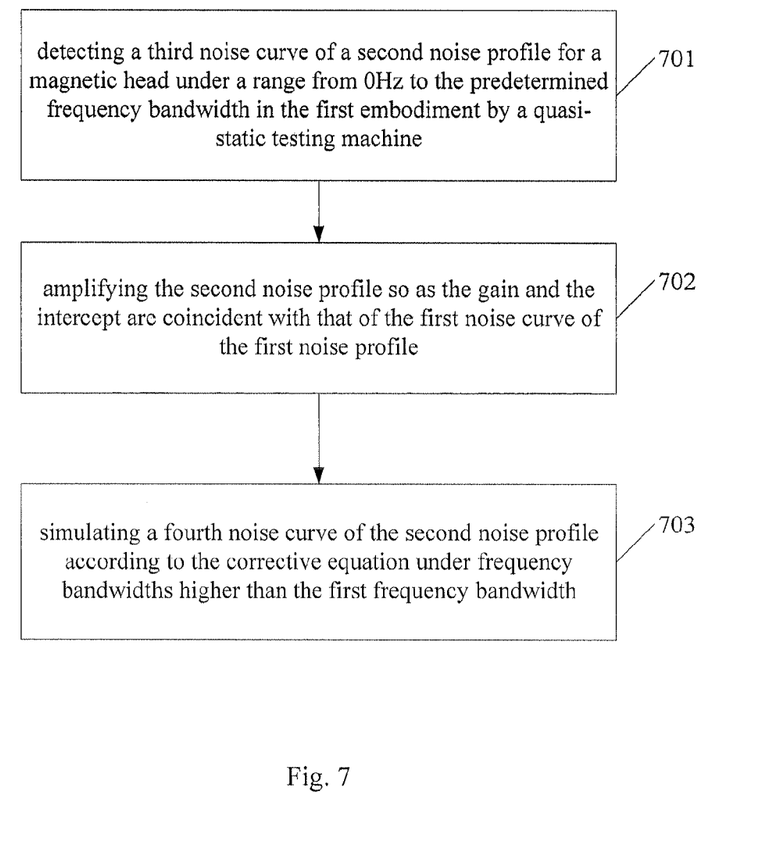
FIG. 7 is a flowchart of a noise-testing method for a magnetic head by using the spectral simulation method mentioned above according to an embodiment of the present invention.

FIG. 7 is a flowchart of a noise-testing method for a magnetic head by using the spectral simulation method mentioned above according to an embodiment of the present invention. As shown, the noise-testing method includes:

Step (701), detecting a third noise curve of a second noise profile for a magnetic head under a range from 0 Hz to the predetermined frequency bandwidth in the first embodiment by a quasi-static testing machine;

Step (702) amplifying the second noise profile so as the gain and the intercept are coincident with that of the first noise curve of the first noise profile; and Step (703) simulating a fourth noise curve of the second noise profile according to the correlative equation under frequency bandwidths higher than the first frequency bandwidth.

In this embodiment, the predetermined frequency bandwidth is 80 MHz, that is, the quasi-static testing machine detect the noise profile of the magnetic head under the frequency bandwidth of 0~80 MHz in the step (701). As known to the people ordinarily skilled in the art, the patterns of the noise profiles detected by the quasi-static testing machine and the dynamic testing machine for the same magnetic head are similar, but their gains of the noise profiles are different. Generally, the gain of the noise profile detected by the quasi-static testing machine is smaller than that detected by the dynamic testing machine. Thus, the step (702) aims at amplifying the third noise curve of the second noise profile, so as the gain are coincident with that of the first noise curve of the first noise profile, wherein the gain coefficient is known to the people ordinarily skilled in the art.

In the step (703), concretely, the correlative equation that is the first linear function established in the first embodiment is Y=−0.00162X+0.00046. Thus, the fourth noise curve located at the frequency bandwidths that are higher than 80 MHz can be simulated by this first linear function.

As a preferable embodiment, based on the second embodiment of the spectral simulation method, the noise-testing method of the present invention also can simulate the other noise profile at the other frequency bandwidth range. For example, if the predetermined frequency bandwidth is 50 MHz, the fourth noise curve under 50 MHz~300 MHz or 50 MHz~1 GHz can be simulated by the function established from table 1: Y=−0.00167X+0.00046. If the predetermined frequency bandwidth is not the data within the table 1, the slope of the straight line to be simulated can be calculated by the equation (2), and the noise level can be calculated by the equation (3).

Figure 8:
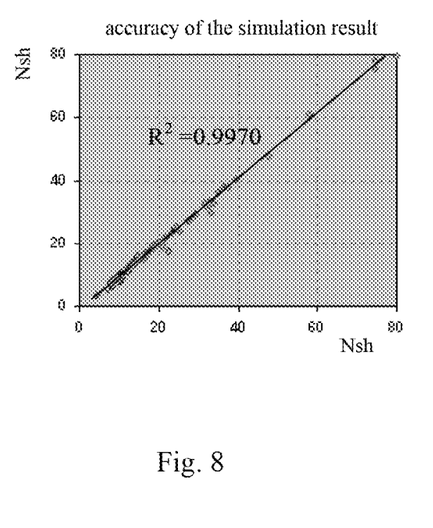
FIG. 8 shows the accuracy of the simulation result according to the present invention.

FIG. 8 shows the accuracy of the simulation result according to the present invention, wherein X-axis denotes the noise level Nsh detected by the dynamic testing machine, and Y-axis denotes the noise level Nsh detected by the simulation method of the present invention. The degree of accuracy $R^2$ between the simulation result of the present invention and the result detected by the dynamic testing machine can be calculated, in this example, $R^2$ is equal to 0.9970. The degree of accuracy $R^2$ is the better if the value approaches to 1. By this token, the accuracy of the noise-testing method according to the present invention is quite high.

In conclusion, comparing with the prior art, as the present invention separates the noise profile into a lower frequency bandwidth curve and a higher frequency bandwidth curve, and simulating and establishing the correlative equation (that is the first linear function in the first embodiment) for the higher frequency bandwidth. Thus, the present invention can use a quasi-static testing machine to detect noise curve in the lower frequency bandwidth range firstly, and then simulate the noise curve according to the correlative equation, thereby obtaining a whole noise profile of the magnetic head in a sufficient frequency bandwidth range, without using the dynamic testing machine. Therefore, the defective magnetic head can be detected only by the quasi-static testing machine, which saves the testing time, improve the testing efficiency and achieve high testing accuracy. Alternatively, the operator can detect noise curve in the lower frequency bandwidth range by using the dynamic testing machine first, and then simulate the noise curve according to the simulated function at the higher frequency bandwidth range, which also can save time and improve the testing efficiency.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A spectral simulation method during a noise testing for a magnetic head, the method comprising:
    (a1) detecting several first noise profiles for several magnetic head samples under a first frequency bandwidth range by a dynamic testing machine;
    (b1) separating each first noise profile into at least two noise curves including a first noise curve and a second noise curve at a predetermined frequency bandwidth, wherein the first noise curve has a frequency bandwidth range lower than that of the second noise curve;
    (c1) fitting several mathematical equations according to the second noise curves; and
    (d1) establishing a correlative equation among the mathematical equations, so as to simulate the second noise curve for each magnetic head.

2. The spectral simulation method according to claim 1, wherein the mathematical equations and the correlative equation in (c1) and (d1) are linear functions.

3. The spectral simulation method according to claim 2, wherein (c1) further comprises (c11) fitting several straight lines according the second noise curves, and obtaining several slopes and intercepts according to the straight lines; and (d1) further comprises (d11) establishing a first linear function according to several slopes and the intercepts.

4. The spectral simulation method according to claim 3, wherein (d1) further comprises (d12) repeating (b1) at a plurality of different predetermined frequency bandwidths respectively to obtain several second noise curves, and repeating (c11) and (d11), so as to establish a plurality of different first linear functions and obtain a constant intercept.

5. The spectral simulation method according to claim 4, wherein (d1) further comprises (d13) establishing a second linear function according to the different first linear functions, thereby obtaining a correlation between the predetermined frequency bandwidth and the slopes of the first linear function.

6. The spectral simulation method according to claim 5, wherein (d1) further comprises (d14) establishing a general formula between noise level and the predetermined frequency bandwidth according to the second linear function established in (d13) and the constant intercept estimated in (d12).

7. The spectral simulation method according to claim 1, wherein the first frequency bandwidth range is from 0 Hz to 1 GHz.

8. The spectral simulation method according to claim 7, wherein the first frequency bandwidth range is from 0 Hz to 300 MHz.

9. The spectral simulation method according to claim 1, wherein the predetermined frequency bandwidth has a range of 0 Hz~200 MHz.

10. The spectral simulation method according to claim 1, wherein the predetermined frequency bandwidth is 80 MHz.

11. A noise-testing method for a magnetic head by using the spectral simulation method according to claim 1, further comprising:
    (a) detecting a third noise curve of a second noise profile for a magnetic head under a range from 0 Hz to the predetermined frequency bandwidth by a quasi-static testing machine;

(b) amplifying the third noise curve of the second noise profile so that the gain is coincident with that of the first noise curve of the first noise profile; and (c) simulating a fourth noise curve of the second noise profile according to the correlative equation under frequency bandwidths higher than the predetermined frequency bandwidth.

12. The noise-testing method according to claim 11, wherein the mathematical equations and the correlative equation in (c1) and (d1) are linear functions.

13. The noise-testing method according to claim 12, wherein (c1) further comprises (c11) fitting several straight lines according the second noise curves, and obtaining several slopes and intercepts according to the straight lines; and (d1) further comprises (d11) establishing a first linear function according to several slopes and the intercepts.

14. The noise-testing method according to claim 13, wherein (d1) further comprises (d12) repeating (b1) at a plurality of different predetermined frequency bandwidths respectively to obtain several second noise curves, and repeating (c11) and (d11), so as to establish a plurality of different first linear functions and obtain a constant intercept.

15. The noise-testing method according to claim 14, wherein (d1) further comprises (d13) establishing a second linear function according to the different first linear functions, thereby obtaining a correlation between the predetermined frequency bandwidth and the slopes of the first linear function.

16. The noise-testing method according to claim 15, wherein (d1) further comprises (d14) establishing a general formula between noise level and the predetermined frequency bandwidth according to the second linear function estimated in (d13) and the constant intercept estimated in (d12).

17. The noise-testing method according to claim 16, further comprising simulating the fourth noise curve of the second noise profile according to the general formula.

18. The noise-testing method according to claim 11, wherein the first frequency bandwidth range is from 0 Hz to 1 GHz.

19. The noise-testing method according to claim 18, wherein the first frequency bandwidth range is from 0 Hz to 300 MHz.

20. The noise-testing method according to claim 11, wherein the predetermined frequency bandwidth has a range of 0 Hz~200 MHz.

21. The noise-testing method according to claim 20, wherein the predetermined frequency bandwidth is 80 MHz.

* * * * *